ABBOT R. DAVIS, OF CAMBRIDGE, MASSACHUSETTS.

*Letters Patent No. 86,649, dated February 9, 1869.*

IMPROVED APPLE-SAUCE.

The Schedule referred to in these Letters Patent and making part of the same.

*To all whom it may concern:*

Be it known that I, ABBOT R. DAVIS, of Cambridge, in the county of Middlesex, and State of Massachusetts, have invented an Improved Sauce as a new article of manufacture; and I do hereby declare that the following is a full, clear, and exact description thereof.

The article of food commonly known as "Shaker apple-sauce," is prepared by boiling cider until it has evaporated to about one-half or one-third of its original bulk, and then adding apples, either green or dried, which are afterward boiled in the cider until they become tender, and thoroughly saturated.

This boiling down of the cider (which is usually composed, more or less, of sweet apples,) serves to concentrate its saccharine properties, and form a sirup which does not possess sufficient acidity or tartness to allow of the addition of the required amount of sweetening to preserve the sauce for a considerable length of time, or in a warm climate; and My invention consists in the employment of tamarinds, in connection with cider and apples, the tartaric acid contained in the tamarinds uniting with the malic acid in the cider and apples, and imparting to the same an agreeable tart flavor, which will allow of the addition of a sufficient amount of sweetening to preserve it, without rendering it too sweet or insipid.

To enable others skilled in the art to understand and use my invention, I will proceed to describe the manner in which I have carried it out.

The cider is boiled down to about one-half its bulk, and the apples, either dried or green, with the skin and cores removed, are then added thereto, the boiling being continued until the apples are saturated with the cider.

Next, the tamarinds are prepared as follows: To a certain quantity of tamarinds is added about half the quantity of boiling cider, which acts to soften the soluble portions, which are then passed through a sieve to remove the seeds, skins, stems, &c., leaving a soft pulpy mass. To this tamarind pulp a sufficient quantity of sugar or molasses is added, to give the required sweetening, and the tamarind pulp so sweetened is then added to the cider and apples while boiling, the whole being stirred together so as to thoroughly mix and incorporate the several ingredients.

It is evident that the proportion of the above-enumerated ingredients may be varied to suit the taste and the requirements of the case. For instance, if the sauce is intended for warm climates, more tamarinds and sweetening may be added than would otherwise be required.

By the use of tamarinds, the flavor can be made more or less tart, which is not the case where cider and apples only are employed.

*Claim.*

What I claim as my invention, and desire to secure by Letters Patent, as a new article of manufacture, is—

The within-described sauce, composed of apples, cider, and tamarinds, substantially as set forth.

ABBOT R. DAVIS.

Witnesses:
N. W. STEARNS,
L. E. BATCHELLER.